United States Patent [19]

Kinzie

[11] 4,446,508

[45] May 1, 1984

[54] EDGE LIGHTED ARTICLE HOLDER

[75] Inventor: Michael R. Kinzie, Mishawaka, Ind.

[73] Assignee: Plast-Ad, Inc., Mishawaka, Ind.

[21] Appl. No.: 458,299

[22] Filed: Jan. 17, 1983

[51] Int. Cl.³ .............................................. F21V 7/04
[52] U.S. Cl. ....................................... 362/31; 362/97;
    362/101; 362/145; 362/153; 362/154; 362/190;
    362/208; 362/253; 362/355; 362/431
[58] Field of Search .................... 362/31, 101, 97, 154,
    362/190, 208, 145, 153, 253, 355, 431

[56] References Cited
U.S. PATENT DOCUMENTS 4,254,452 3/1981 Switala ................................ 362/101

Primary Examiner—Stephen J. Lechert, Jr.
Attorney, Agent, or Firm—James D. Hall

[57] ABSTRACT

An edge lighted article holder including a body having an upper wall and a lower wall connected by a web. Openings are formed in the upper wall which conform to the outer shape of the article so that articles may be placed within the openings and supported by the lower wall. The upper and lower walls and the web are formed of light transmitting material. A light source is placed within the plane of the walls or web to allow light to be transmitted through the holder to illuminate the edges of the article openings.

9 Claims, 6 Drawing Figures

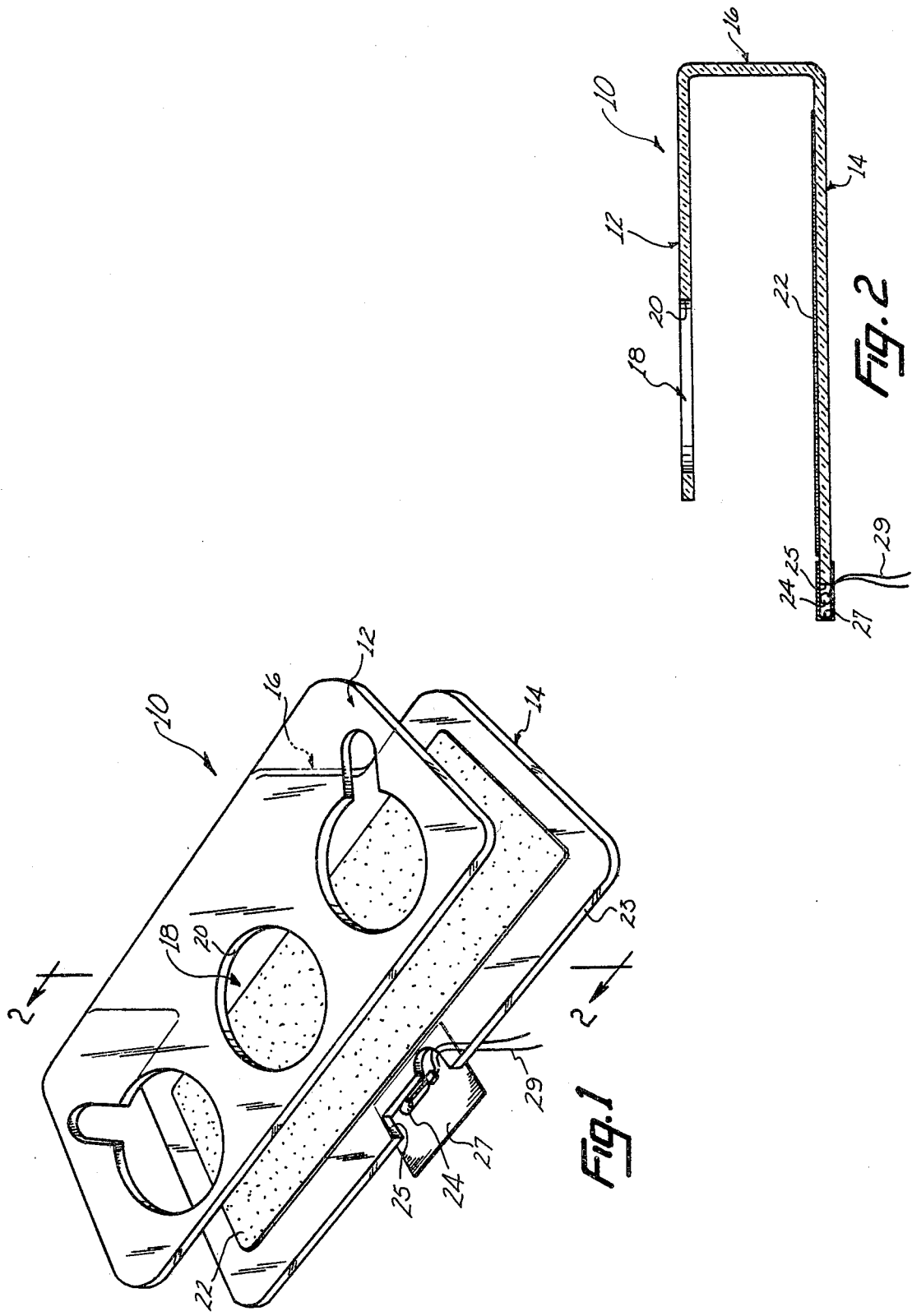

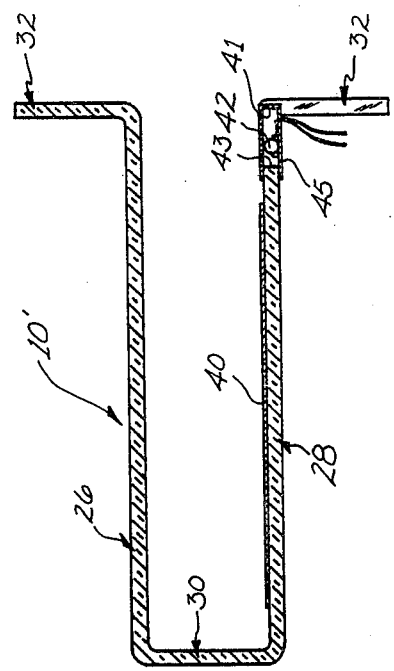
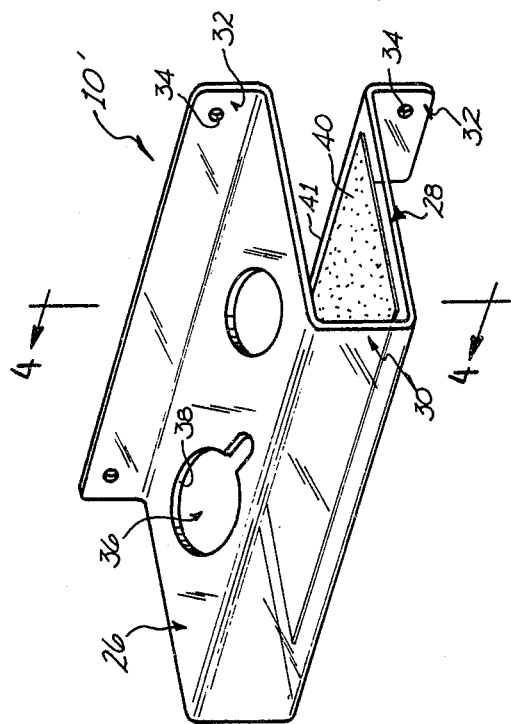

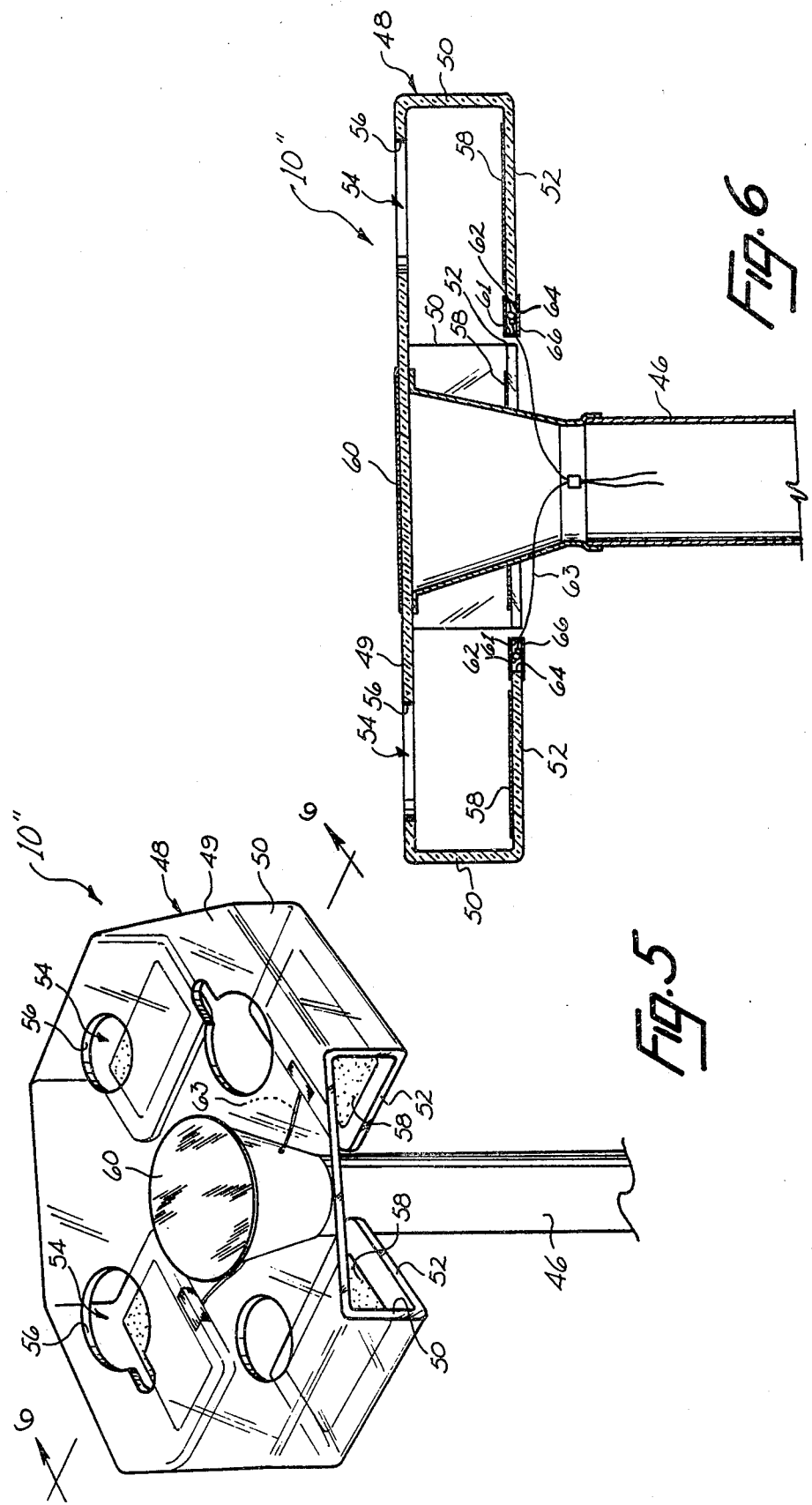

EDGE LIGHTED ARTICLE HOLDER

SUMMARY OF THE INVENTION

This invention relates to an edge lighted article holder for use in supporting items such as liquid filled containers.

While the present related art includes lighted article holders, the lighting for these holders is placed to shine through the holders with little or no illumination of the openings therein for the articles.

The present invention is an article holder constructed of a rigid, light transmitting material and having an upper wall and a lower wall connected by a web. The holder upper wall has openings to receive the articles which are supported therein by the holder lower wall. The improvement of the invention includes the placement of a lighting element within the plane of one of the holder upper or lower walls or web which causes light to be transmitted through the body of the article holder to illuminate the edges of the upper wall article openings. This eases placement of articles within the article holder during poor lighting conditions. The article holder may have as one of its uses, for example, the securement of a coffee cup or similar drink container for a driver or passenger of a motor vehicle. In such a use the article holder would be constructed such that it could be attached to an available surface within a motor vehicle.

Accordingly, it is an object of this invention to provide an article holder which facilitates the easy placement of an article within the holder.

Another object of this invention is to provide an article holder having a lighted opening in an upper wall of the holder which is shaped to receive an article.

Other objects of the invention will become apparent upon a reading of the following description.

BRIEF DESCRIPTION OF THE DRAWINGS

FIG. 1 is a perspective view of a first embodiment of this invention with portions of the light element exposed for purposes of illustration.

FIG. 2 is a sectional view of a first embodiment taken along line 2—2 of FIG. 1 showing the light element in its assembled mode.

FIG. 3 is a perspective view of a second embodiment of the invention, having attachment flanges at one side with the lower flange being split to permit attachment of the lighting element.

FIG. 4 is a sectional view of the second embodiment taken along line 4—4 of FIG. 3.

FIG. 5 is a perspective view of a third embodiment of the invention.

FIG. 6 is a sectional view of the third embodiment taken along line 6—6 of FIG. 5.

DESCRIPTION OF THE PREFERRED EMBODIMENTS

The preferred embodiments illustrated are not intended to be exhaustive or to limit the invention to the precise forms disclosed. They are chosen and described to explain the principles of the invention and its application and practical use to thereby enable others skilled in the art to utilize the invention.

One embodiment of the article holder is shown in FIGS. 1 and 2. Article holder 10 includes an upper wall 12 and a lower wall 14. Upper wall 12 and lower wall 14 are connected at corresponding edges by a web 16. Article holder 10 is preferably formed of G-cast acrylic which is fire-polished at the edges. This material is chosen for its light conductive properties and resistance to any adverse reaction caused by fire polishing.

Upper wall 12 of holder 10 has openings 18 which are shaped at their edges 20 to conform to the outer cross-sectional configuration of an article such as a drink container (not shown). The spacing between upper wall 12 and lower wall 14 is such that when a drink container is placed within an opening 18 the bottom of the container will rest upon the lower wall with the container projecting in part above the upper wall. Openings 18 are preferably oversized to allow the articles to loosely fit within the openings. An absorbent, cushioning mat 22 is applied over the upper surface of holder lower wall 14 to aid in prevention of slippage of the container and absorption of any spills from the container. Mat 22 may be formed of cork, felt, or similar type of material. The edges 20 of openings 18 are preferably fire-polished.

A light 24 is positioned next to edge 23 of holder lower wall 14 within a recess 25 formed in the wall. Light 24 may be secured within recess 25 by a strip of opaque tape 27 which adheres to lower wall 14 and covers the recess. Light 24, when the holder is used in a vehicle, will operate from a 12-volt source connected to wires 29 but may be operative in response to different voltage levels depending upon the use to which the holder is to be adapted. Light 24 provides a source of illumination which is transmitted by the light conducting lower wall 14, web 16, and upper wall 12 to the edges 20 of openings 18 in the holder upper wall. This causes the opening edges 20 to be visible in the dark or during other poor lighting conditions, thereby facilitating the placement of an article, such as a cup, within an opening 18 in holder 10. Openings 18, by being preferably slightly larger than the articles placed therein, allow for the visibility of the opening edges and easy location of the articles after their placement within the holder. The primary intended use of article holder 10 is its placement in vans or other similar vehicles such that the driver or passengers in the vehicle may place articles, or containers, in the holder, as indicated, for safe, spill-free support during travel in the vehicle.

A second embodiment of the article holder is shown in FIGS. 3 and 4. Article holder 10' is similar in construction to the first embodiment and is intended to be attached to a verticle surface. The article holder 10' includes an upper wall 26 and a lower wall 28 connected by a web 30. Holder upper wall 26 and lower wall 28 each have a flange 32 formed at an edge opposite to web 30. Flanges 32 are oppositely extending and are provided with openings 34 for the screw attachment of the article holder 10' to a suitable vertical surface.

Openings 36, having edges 38 shaped to conform to the shape of an article, such as a drink container, are formed in holder upper wall 26. An article placed within an opening 36 will rest upon and be supported by lower wall 28. A mat 40 formed of a cushioning, absorbent material, such as cork, is applied to lower wall 28 to prevent slippage of the article upon the lower wall and for absorbing any spills from the article. A light 42 is carried by holder lower wall 28 within a recess or cavity 43 formed in the edge 41 of lower wall 28. The lower flange 32 is split below cavity 43 to allow this positioning of the light 42. Light 42 is preferably retained within cavity 43 by an adhesive tape 45 applied over the cavity. Light 42 provides a source of illumination which is transmitted by light conducting lower wall 28, web 30, and upper wall 26 to the edges 38 of openings 36. This facilitates the use of the article holder 10' in the dark, or similar low light situations. One use of article holder 10' is the attachment of the article holder to a door or other vertical surface in a van or similar vehicle so that the driver and passengers may make use of the article holder during travel.

A third embodiment of the article holder is shown in FIGS. 5 and 6. Article holder 10" includes a pedestal base 46 which supports the article holder. Article holder 10" forms a tabletop 48 which rests on pedestal base 46. Tabletop 48 is preferably formed of G-cast acrylic which is fire-polished at its edges. Tabletop 48 includes downwardly extending opposed side pieces 50, or webs, which are preferably substantially normal to the upper or top wall 49 of the tabletop. Each side piece 50 terminates in an inwardly turned lower wall or flange 52 spaced below top wall 49. Openings 54 are formed in top wall 49 and are preferably spaced circumferentially about pedestal base 46. Each opening 54 is positioned above a flange 52 and has an edge 56 shaped to receive an article, such as a container. Each opening edge 56 is fire-polished. This arrangement of flanges 52 and top wall 49 cooperate to secure and support articles placed within openings 54 with the articles resting at their bottom ends upon flanges 52. Each flange 52 is preferably covered on its top surface with a soft, absorbent mat 58. A decorative cover 60 may be placed upon top wall 49 to conceal the upper end of the pedestal 46 from view.

A light 62 is carried at the inner edge 61 of one or more flanges 52. Each light 62 is positioned within a cavity 64 formed in the flange edge 61 and is retained within the cavity by a foil or similar opaque adhesive tape 66 applied over the cavity. Wires 63 which are connected to a power source pass downwardly through pedestal base 46. Each light 62 provides a source of illumination which is transmitted by light conducting flanges 52, side pieces 50, and top wall 49 to the edges 56 of openings 54 in the tabletop.

It is to be understood that the invention is not to be limited to the preferred embodiments described above but may include other embodiments such as a flat tray formed of the stated preferred material and having edge-lighted indentations formed in the upper surface thereof to receive an article, such as a container. It is also to be understood that the invention may be otherwise modified within the scope of the appended claims.

I claim:

1. In an article holder having an upper wall and a lower wall connected by a web, opening means in said upper wall defined by an edge for receiving an article, said lower wall adapted to support said article when the article is placed within said opening means, said upper and lower walls and said web formed of light transmitting material, the improvement in said article holder comprising a lighting element means secured within the plane of one of said upper and lower walls and said web for transmitting light through said one wall or web to illuminate said opening means edge in the upper wall.

2. The article holder of claim 1 wherein said upper wall and said lower wall are substantially parallel to one another and connected by said web at corresponding edges to give said article holder a C shape.

3. The article holder of claim 2 wherein an opposite edge of each upper wall and lower wall terminates in an outturned flange to permit said article holder to be attached at said flanges to a vertical surface.

4. The article holder of claim 1 wherein said one wall or web has a recess, said lighting element secured within said recess.

5. The article holder of claim 1 wherein said upper wall is supported upon a pedestal base.

6. The article holder of claim 5 and a second lower wall connected by a second web, each first mentioned and second lower wall spaced from said pedestal base, said opening means including an article receiving opening located over each first mentioned and second lower wall, said second lower wall and web formed of light transmitting material.

7. The article holder of claim 6 wherein said first mentioned and second lower wall are located on opposite sides of said pedestal base.

8. The article holder of claim 7 wherein said lighting element means is secured within the plane of said first mentioned lower wall.

9. The article holder of claim 8 and a second lighting means secured within the plane of said second lower wall.

* * * * *